United States Patent [19]

Ryan

[11] Patent Number: 4,597,549
[45] Date of Patent: Jul. 1, 1986

[54] AIRCRAFT MID-CABIN DIVIDER

[75] Inventor: James M. Ryan, New York, N.Y.

[73] Assignee: Falcon Jet Corporation, Teterboro, N.J.

[21] Appl. No.: 655,521

[22] Filed: Sep. 28, 1984

[51] Int. Cl.[4] .......................... B64C 1/14; B64D 11/00
[52] U.S. Cl. .............................. 244/118.5; 244/129.5; 160/DIG. 8; 160/37; 160/127
[58] Field of Search ............... 244/118.5, 129.4, 129.5; 160/DIG. 8, 32, 37, 39, 62, 94, 97, 98, 101, 107, 113, 118, 119, 127, 181, 206, 208, 209, 214, 215, 262, 265

[56] References Cited

U.S. PATENT DOCUMENTS

| | | | |
|---|---|---|---|
| 2,307,560 | 1/1943 | Apel | 160/40 |
| 2,378,856 | 6/1945 | Laddon et al. | 160/118 |
| 2,396,039 | 3/1946 | Burton et al. | 244/118.5 |
| 2,710,731 | 6/1955 | Bright et al. | 244/118.6 |
| 4,121,392 | 10/1978 | Plewacki | 160/32 |
| 4,185,799 | 1/1980 | Richards, Jr. | 244/118.5 |

Primary Examiner—Trygve M. Blix
Assistant Examiner—Rodney Corl
Attorney, Agent, or Firm—Morgan, Finnegan, Pine, Foley & Lee

[57] ABSTRACT

An aircraft mid-cabin divider comprises a double-bulkhead, a vertical wrapping-post within the double-bulkhead, and a wrap-around door having a series of parallel vertical panels flexibly interconnected wherein the first vertical panel is hingeably secured to the vertical wrapping post and a second vertical panel on the substantially opposite end of the door from the first one includes a handle and latch for directing the movement of the tambour door and latching the same about an opposing edge. To be placed in its stowed or open position, the tambour door is rolled backwards around the vertical wrapping-post and drawn between the double bulkheads. A passageway is provided within one of the double-bulkheads through which the door handle may be traversed while the door is inside of the bulkheads.

2 Claims, 6 Drawing Figures

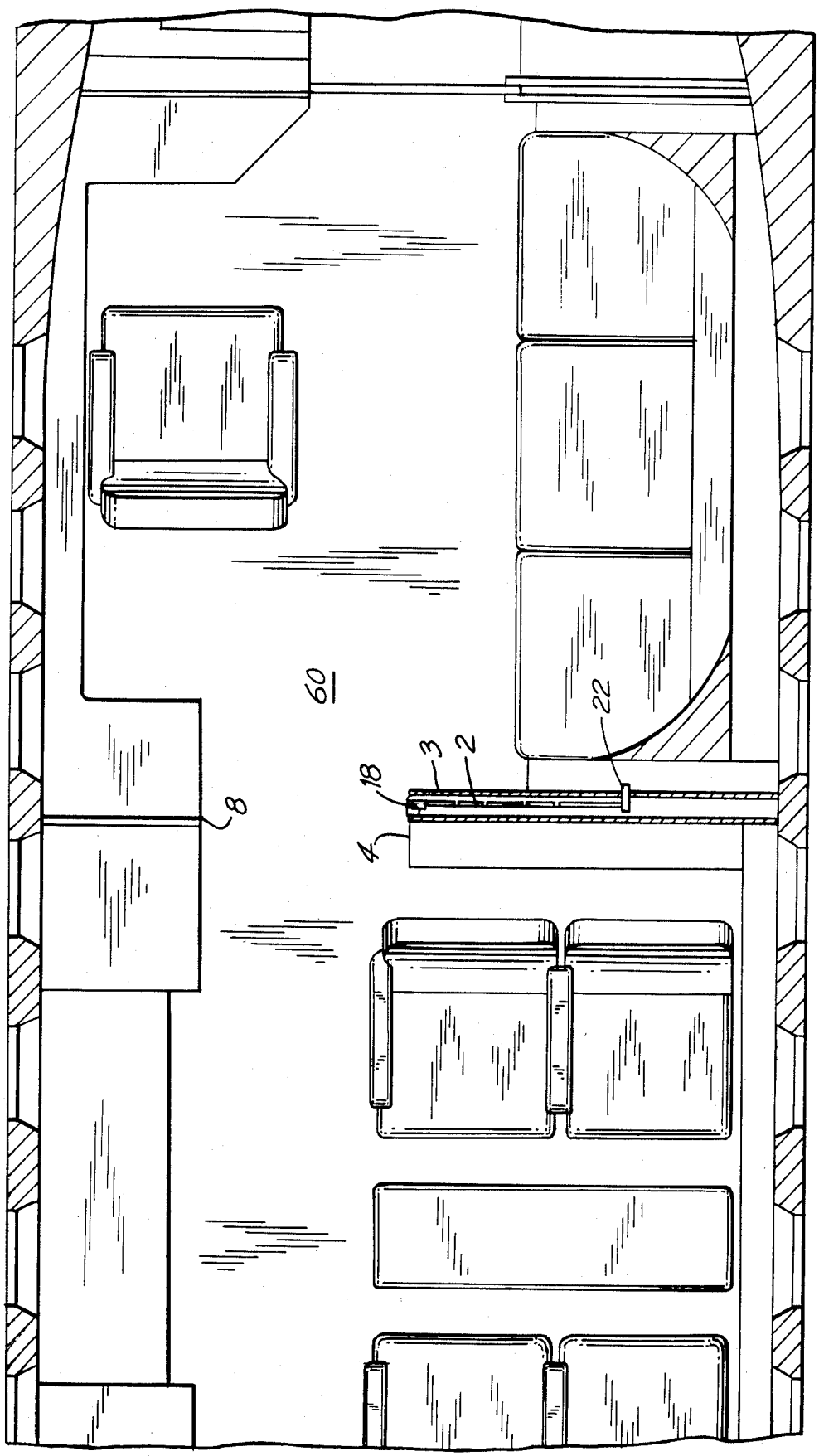

AIRCRAFT MID-CABIN DIVIDER

BACKGROUND OF THE INVENTION

The invention pertains to room dividers. More particularly, the invention pertains to cabin dividers for use on board vehicles such as aircraft.

It has long been known to provide temporary partitions or dividers for temporarily segregating or partitioning a single larger room into two or more smaller compartments when it is otherwise undesirable to install permanent wall dividers. Particularly, it has long been known to provide partitions or bulkheads of various forms to partition vehicular space, such as in an aircraft cabin, into smaller compartments. Thus, it has been and continues to be desirable to divide an aircraft cabin into two or more compartments in order, for example, to separate coach from first class passengers on board commercial flights or to provide private compartments for executives on board corporate class aircraft.

U.S. Pat. Nos. 4,185,799 (Richards 1980), 2,710,731 (Bright et al 1955) and 2,307,560 (Apel 1943) all disclose partitions such as have been provided in the past for dividing cabins or compartments into smaller areas on board vehicles. In the past, such compartment dividers typically consisted either of rigidly fixed partitions of pre-defined shape (U.S. Pat. Nos. 4,185,799; 2,307,560) or merely provided curtain-type compartment dividers which were inadequate to ensure any great degree of privacy between the two compartments separated by the partition.

Room dividers for earth structures and dwellings illustrate a variety of folding door constructions. See, for example, U.S. Pat. Nos. 2,677,420 (Kaypur 1954), 2,978,020 (Paulsrude 1961), and 2,897,515 (Collins 1959). However, room dividers such as are provided in earth structures are considered too bulky and heavy for use on board aircraft.

Even the double hinged, folding door type of cabin divider has certain drawbacks which often result in such dividers not being provided on board aircraft. These drawbacks include (1) when the divider is in its open position, i.e. the passageway through said divider is open, the folding closure member is displaced within the passenger compartment and thereby takes up valuable compartment space, and (2) the folded up cabin dividers create an unsightly appearance about the passageway therein when the divider is in its open position.

It is known to provide small scale tambour or rolling doors to cover, for example, desk areas of a rolling type desks, the entire door portion being pushed back within a track into the desk when the work area of the same is exposed. It has not heretofore been known to provide tambour or rolling door constructions to vehicular room dividers. Further, due to the curvature of the aircraft fuselage it has clearly not heretofore been known to provide tambour door constructions within aircraft cabin dividers.

It is therefore an object of the invention to provide a vehicular cabin divider which is easily retractable or extendable.

It is a further object of the invention to provide a vehicular cabin divider of light weight construction which requires a minimum amount of storage space when the same is in its retracted or open position.

It is a further object of the invention to provide a vehicular cabin divider which includes a door which may be either open or closed.

It is yet another object of the invention to provide a vehicular cabin divider having a door which may be either open or closed, wherein said door would be hidden from view when the door is in its open configuration.

SUMMARY OF THE INVENTION

These and other objects of the invention are met by providing a vehicular cabin divider comprising a double-bulkhead, a vertical wrapping-post mounted within the double-bulkhead at a point substantially about the inboard edge of the double bulkhead, and a door comprising a contiguous series of parallel vertical panels connected one to another by flexible fastening means, the contiguous vertical panels forming a planer door surface when the door is in a closed configuration. A first contiquous one of the vertical panels is rigidly secured about one edge of the vertical wrapping post and a last of the contiguous vertical panels on the substantial opposite end of the door from the first one is provided with a handle for directing the movements of the door. The space between the double bulkheads is wide enough to accommodate the combined width of the vertical wrapping post and one of the individual vertical panels and is deep enough to accommodate the stowed length of the door. One of the double-bulkheads opposite the wrapping surface of the last vertical wrapping-post includes a passageway for the handle affixed to the vertical panel to traverse. The cabin divider thereby is dually configurable. In a first configuration, the door extends from said double bulkheads to effect a door function while in a second configuration, the door, being lead first by the handle and the last panel through the passageway within the double-bulkhead, is retracted within the double-bulkhead and out of view.

BRIEF DESCRIPTION OF THE DRAWINGS

The invention will be described more fully below by way of reference to the following drawings, in which:

FIG. 4 is a plan of a vehicle, such as an aircraft, including a cabin divider according to the instant invention.

DETAILED DESCRIPTION OF THE DRAWINGS

Figure 1:
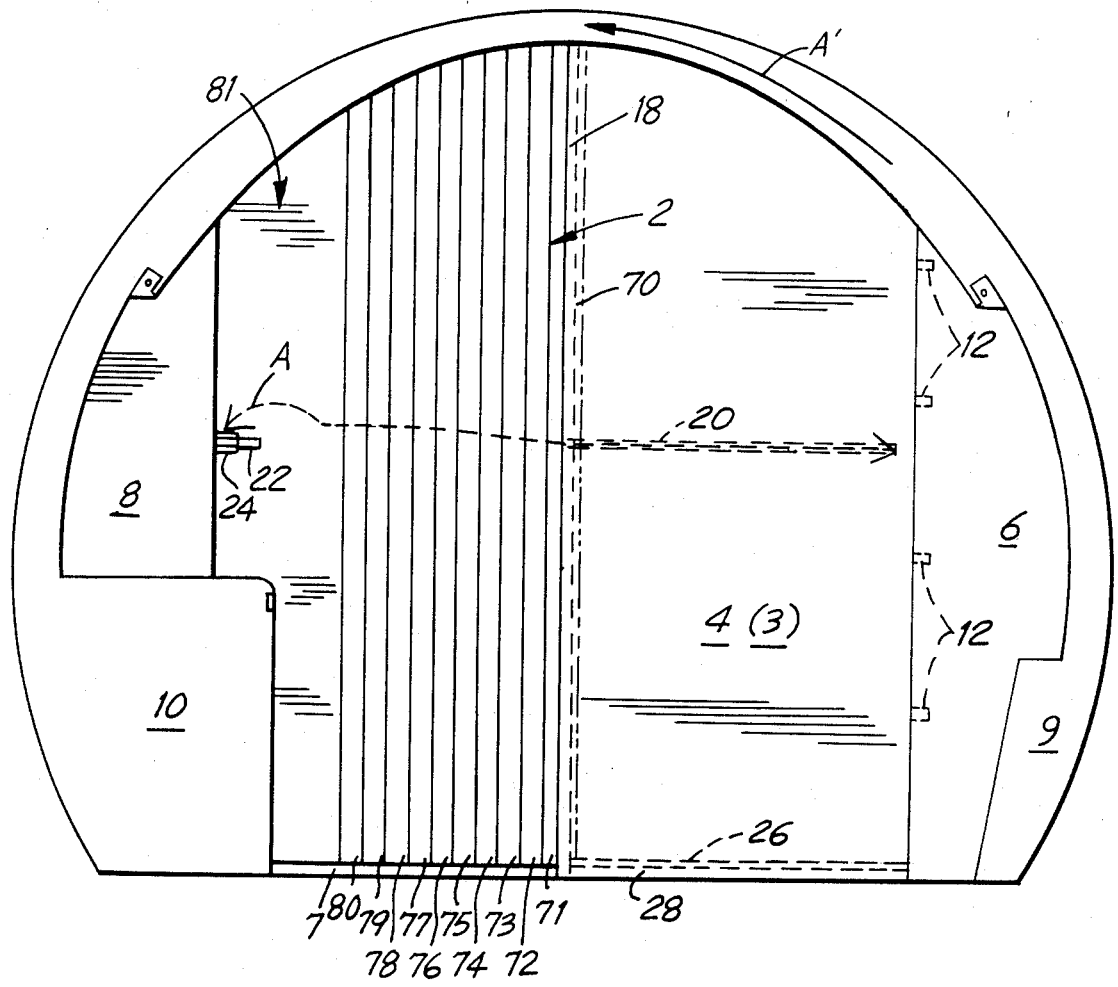
FIG. 1 is an elevation showing a cabin divider in accordance with the instant invention, the wrap-around door being shown extended from the double bulkheads.

FIG. 1 illustrates a vehicle, such as an airplane, including a cabin divider according to the instant invention. Particularly, FIG. 1 illustrates a double bulkhead 4(3), and a door 2 extending therefrom and contacting permanent bulkhead 8.

Door 2 comprises a contiguous series of parallel vertical panels 70–81 hingeably connected one to another so as to form a planar door surface when the door 2 is fully extended. Door 2 further includes a latchable, double door handle 22 which extends on both sides of the door for cooperating with a door latching means 24 secured to permanently mounted bulkhead 8. Door handle 22 is accessible from either forward or aft of door 2 when the door is in its closed, or partially extended configuration (FIG. 1). However, with the embodiments of FIGS. 1 and 2, when the door is retracted, door handle 22 is accessible to close the door only from the aft enclosed compartment and is not accessible from the forward cabin.

Led by handle 22, the closed door 2 of FIG. 1 may be retracted or extended into its open or closed door configurations by wrapping the door 2 backwards or unwrapping it forwards along the path of double-arrow A.

Figure 2:
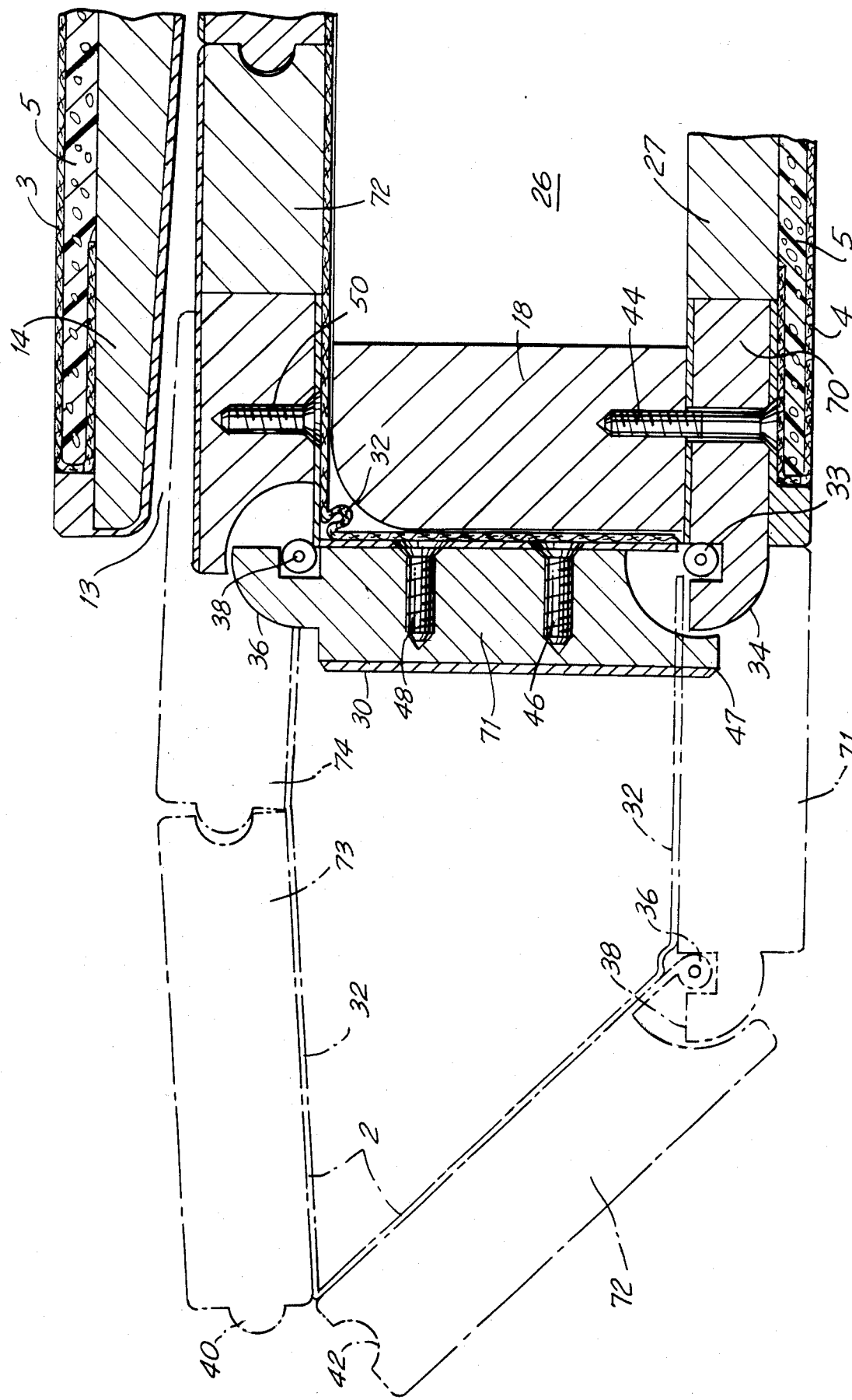
FIG. 2 is a top, cross-sectional view of an embodiment of the invention taken about the mid-cabin edge of the double bulkheads of FIG. 1.

As the flexibly hinged door 2 is wrappingly retracted back about post 18, the door handle 22 may be inserted in groove 20 provided within the aft bulkhead 3 of the double bulkheads 4(3). The door 2 wraps about vertical wrapping post 18 and is directed along horizontal base tracking means 26 into a straight, fully retracted position within double bulkheads 4,3 (FIG. 2).

The opposite may be practiced for extending the door 2 outside of the double bulkheads 4(3) and into its closed door configuration. Being pushed by the door handle 22 (See FIG. 4), the door 2 is pushed in the direction of arrow A' (FIG. 1), the handle traversing groove 20 of the aft member 3 of double bulkhead 4(3). The door 2 thereby unrolls, led by panel 71 and followed by panels 72 through 81 until all of the vertical panels 70–81 are in substantial planar alignment. The handle 22 may thereafter be engaged with the latching means 24.

In the embodiment of FIG. 1, the upper curvature of double bulkhead 4(3) is a mirror image of the upper curvature of rolling door 2, thereby allowing rolling door 2 to be stored reversed and fully extended within double bulkhead 4(3). Note that outer vertical panels 81, 80, 79 . . . of roller door 2 must pass to a position within the double bulkheads 4(3), before the more inboard vertical panels . . . 73, 72, 71 are wrapped about wrapping post 18 prior to their being withdrawn within double bulkheads 4.

In the embodiment of FIG. 1, the roller door is supported by a 1" strip on the floor between the double bulkheads 4(3) for elevating the roller door 2 approximately 1" above the floor. The one-inch elevation provides clearance of the extended door above the floor carpet which may be provided. A one-half inch channeling strip 26 is further provided on top of 1" supporting strip 28 running lengthwise within the double bulkheads to serve as a guide for guiding rolling door 2 as it passes within double bulkheads 4(3). The one-half inch channeling strip 26 is displaced from the aft member of the double bulkheads for providing a track therebetween for guiding the passage of the rolling door 2 in such a way that the forward handle 22 will continue to extend from groove 20 for passenger access thereto and for keeping the aft edge of the handle from interferring with forward bulkhead member 4.

In the embodiment of FIG. 1, the double bulkhead 4(3) and rolling door 2 dividing apparatus may be provided between opposing permanent bulkhead members 6, 8. For example, the double bulkhead rolling door divider may be secured via locating pins 12 about permanent bulkhead 6 and may match the contour thereof. Likewise, the contour of the outer extended panels, such as end vertical panel 24 of roller door 2 may have a contour which matches the contour of the opposed permanent bulkhead 8 and/or other interior configurations, such as cabinet 10, which would otherwise interfere with the closing action of folding door 2. In the embodiment of FIG. 1, the upper contour of the double bulkhead 4(3) also matches the contour of the fuselage.

Turning now to FIG. 2, there are illustrated double bulkhead portions 3 and 4, vertical wrapping-post 18, door panels 70, 71, and 72 in their open configuration and vertical panels 70, 71, 72, 73 and 74 (in phantom) in an intermediate configuration as they are beginning to unfold from the double bulkheads 4(3). As stated previously, rolling door 2 is pivotally secured at one end thereof, panel 70, to vertical wrapping post 18, for example via fastening means 44. First vertical panel 70 is further hingeably secured about hinge 33 to second vertical panel 71 which is also hingeably secured about hinge 36 to a third vertical panel 72. The hinging means 33, 36 and hinge grasping means 34, 38 are provided between vertical panels 70, 71 and 71, 72 to provide tight wrapping of the door 2 about wrapping post 18.

Flexible fabric fastening means 32 are provided covering substantially the entire interior surface of door 2 respective the wrapping post 18. The flexible material 32 provides flexible hinge connecting means between the vertical panels whereby the vertical panels will have a common backing for providing support when the same are either in their extended door configuration or retracted within the double bulkheads 3, 4. The flexible nature of the supporting backing material 32 further enables door 2 to flexibly retract within double bulkheads 3, 4 (or flexibly extend therefrom) while wrapping about the vertical wrapping post 18. Metallic or hard plastic hinges 33, 36 are provided between the high-stress inner vertical panels 70, 71, and 72 to provide extra strength but may be replaced simply by flexible fastening means 32. Likewise, piano hinges such as 33, 36 may be provided between each vertical panel if desired. Hinges 33, 36 and fastening means 32 may, but need not necessarily, extend the entire length of the door 2.

The flexible supporting material 32 may be fastened to the vertical panels via fastening means such as screws at 46, 48 and 50 of FIG. 2 or may be glued thereto.

FIG. 2 also illustrates aforementioned channeling strip 26 which is elevated, for example, one-half inch above the foundation strip 28 (FIG. 1) likewise provided within the space between double bulkheads 3, 4. Guide strip 26 enables folding door 2 to be retracted or extended in or from the space between double bulkheads 3, 4 and acts to channel the movement of the rolling door 2 within this area.

Male mating portions 40 and female mating portions 42 may be provided between adjacent vertical panels for providing a more secure and solid linkage therebetween especially when the same are extended in their door configuration. Flexible supporting fabric 32 provides a supportive backing for the vertical panels when extended and along with door latch mechanisms 22, 24 (FIG. 1) provides supporting means for maintaining rolling door 2 in its planer configuration at a height above the floor.

The outer surfaces 30 of vertical door panels such as 71 may be laminated for appearance and durability sake. The edges 47 thereof may thereafter be beveled to eliminate sharp edges.

Double bulkheads 3, 4 may be padded with foam 5. Fabric may decoratively be provided about the outer surfaces of the double bulkheads 3, 4. Structural strength to double bulkheads 3, 4 may be provided by a honeycombed supporting surface 14, 27, respectively or may be fabricated of light weight metal, Nomex, or hard plastic. Vertical panels 70–81 may be similarly constructed.

Permanent bulkhead 6, 8 may be provided as following the contours of interior trim 9, 10 respectively.

Note that although the divider has been disclosed as including vertical wrapping post 18, the invention may quite easily be practiced without the wrapping post; first vertical panel 70 instead being secured about either bulkhead member 3 or 4, with the door thereafter wrapping in the opposite direction.

Figure 3A:
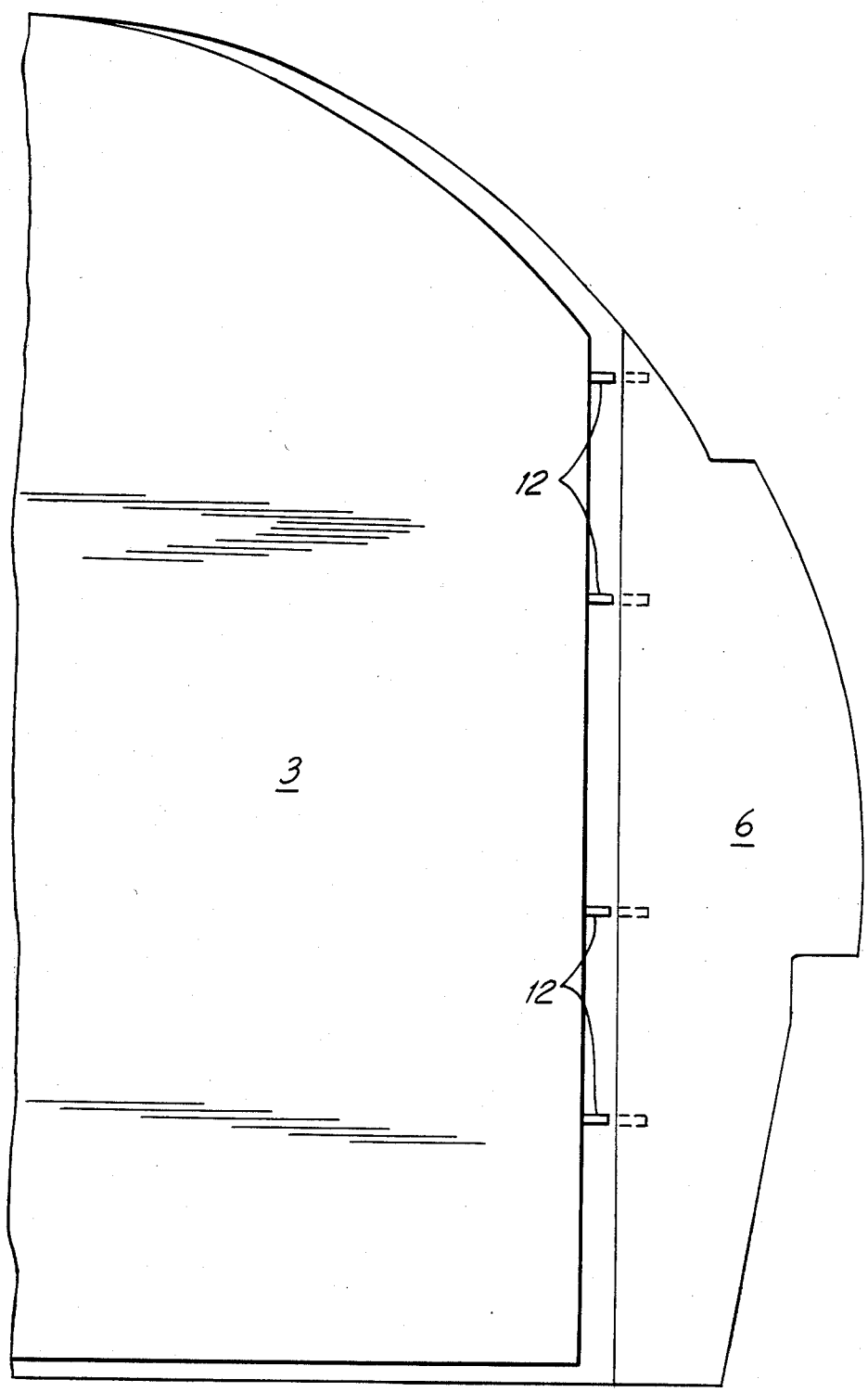
FIGS. 3A, 3B, and 3C are installational guides illustrating a preferred method of installing a cabin divider according to the instant invention.
Figure 3B:
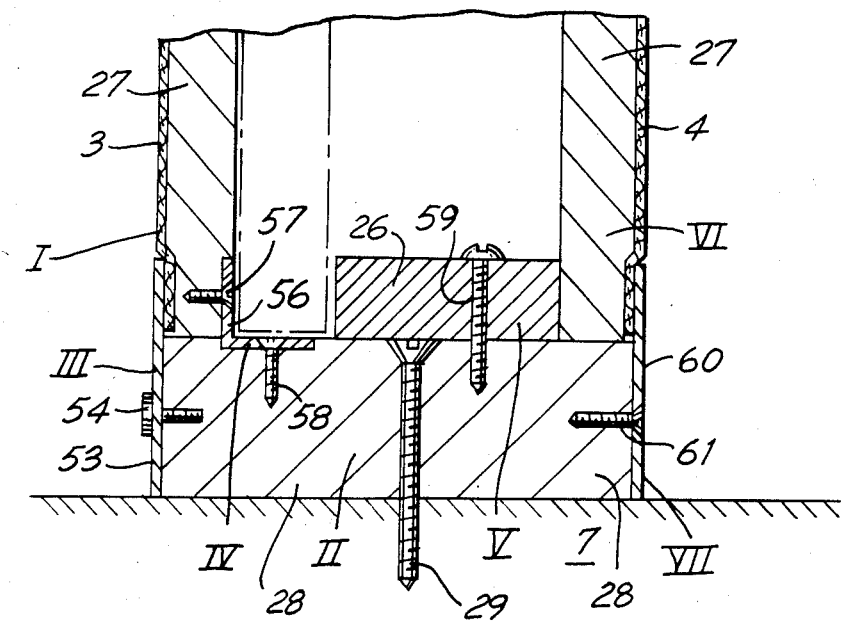
Figure 3C:
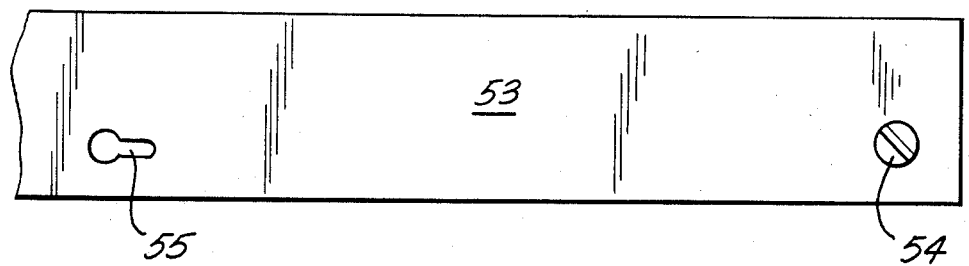

FIGS. 3A through 3C illustrate a preferred method for installing a double bulkhead according to the instant invention. The roman numerals provided in FIG. 3B indicate the step wise order in which the various components are to be installed.

Step I. A first one of the double bulkheads 3 is lifted one inch off of the floor and located within permanent bulkhead 6 via locating pins 12.

Step II. One inch foundation strip 28 is secured to the floor 7 via fastening means 29.

Step III. Metal strip 53 (see FIG. 3C) is connected to 1" foundation strip 28 by a series of key slots 55 where screws would be inaccessable. A single screw 54 on the end thereof fixes metal strip 53 in place.

Step IV. L-shaped tracking and supporting bracket 56 is secured within the right angle formed between the first one 3 of said double bulkheads and the top of one inch foundation strip 28 via fastening means 57 and 58.

Step V. One-half inch channeling strip 26 is secured to one inch foundation strip 28 via fastening means 59.

Step VI. Second one 4 of said double bulkheads is lifted one inch off of the floor 7 and located with locating pins 12.

Step VII. Metal bracket 60 is fastened to one inch foundation strip 28 via fastening means 61, retaining the second one 4 of the double-bulkheads between bracket 60 and the one-half inch chaneling strip 26. Note that the 1½ inch metal strip 53 retains the first one of said double bulkheads 3 between itself and L shaped brace 56.

FIG. 4 illustrates a vehicle such as an aircraft including a cabin divider according to the instant invention. Illustrated in FIG. 4 are individual ones of the double-bulkheads 3 and 4; door 2 in its retracted configuration; and permanent bulkhead 8 for providing a mating surface opposite said double-bulkheads for adjoining door 2 and thereby closing passageway 60.

Although the invention has been described in detail with reference to the drawings and embodiments presented herein, these embodiments and drawings should be deemed to in no way limit the spirit of the invention or the scope of the claims which follow.

I claim:

1. An aircraft cabin divider, comprising: a pair of bulkheads aligned substantially parallel respective each other and spaced a distance apart so as to form both a hollow therebetween and an entrance to said hollow; and a door, one end of which is fixed about the entrance to said hollow so as not to block access thereto, said door comprising a series of panels pivotally connected one to another by joining means; whereby the end of said door opposite said one end may pass through said entrance and within said hollow while drawing therebehind the substantial remainder of said door thereby substantially concealing said door within said pair of bulkheads and wherein said door may thereafter be withdrawn from said hollow, said panels passing through said entrance upon exiting in the opposite order from which they entered.

2. An aircraft cabin divider, comprising a double-bulkhead; a vertical wrapping-post mounted within said double-bulkhead at a point substantially about the inboard edge of said double bulkhead; and a door comprising a finite series of contiguous parallel vertical panels connected one to another by flexible fastening means, said vertical panels forming a planar surface when said door is extended; wherein a first one of said vertical panels is secured about one edge of said vertical wrapping post, and wherein the space between said double-bulkheads is wide enough to accomodate the combined widths of said vertical wrapping-post and the width of individual ones of said vertical panels and is deep enough to substantially accommodate the extended length of said door, whereby a substantially last one of said vertical panels may lead the traversal of said door within the double bulkheads as said door is placed in its open configuration and may trail the traversal of said door without the double bulkheads as said door is placed in its closed configuration.

* * * * *